US009042571B2

(12) United States Patent
Dickins et al.

(10) Patent No.: US 9,042,571 B2
(45) Date of Patent: May 26, 2015

(54) METHOD AND SYSTEM FOR TOUCH GESTURE DETECTION IN RESPONSE TO MICROPHONE OUTPUT

(75) Inventors: Glenn N. Dickins, Como (AU); David P. Doney, Pacifica, CA (US); Andreas Ehret, Nuremberg (DE); Xuejing Sun, Beijing (CN)

(73) Assignees: Dolby Laboratories Licensing Corporation, San Francisco, CA (US); Dolby International AB, Amsterdam (NL)

( * ) Notice: Subject to any disclaimer, the term of this patent is extended or adjusted under 35 U.S.C. 154(b) by 310 days.

(21) Appl. No.: 13/528,681

(22) Filed: Jun. 20, 2012

(65) Prior Publication Data

US 2013/0022214 A1 Jan. 24, 2013

Related U.S. Application Data

(60) Provisional application No. 61/509,199, filed on Jul. 19, 2011.

(51) Int. Cl.
*H04R 1/10* (2006.01)
*G06F 3/043* (2006.01)
(Continued)

(52) U.S. Cl.
CPC ............... *G06F 3/043* (2013.01); *H04R 1/083* (2013.01); *H04R 1/1041* (2013.01); *H04R 1/1083* (2013.01); *H04R 3/00* (2013.01); *G06F 3/04883* (2013.01)

(58) Field of Classification Search
CPC ............. H04R 1/10; H04R 1/16; H04R 1/46; H04R 3/005; H04R 17/04; H04R 17/06; H04R 25/407; H04R 2430/01; H04R 2460/05; H04R 2499/11; H03K 17/965; G10L 17/00; G10L 15/28; G10L 15/10; G10L 15/00; A61B 5/117; H04M 1/0237; H04M 1/0239; H04M 1/0216; H04M 1/2155; H04M 1/2474; H04M 3/62; H04M 2203/6018; H04M 2203/6045; G06F 3/014; G06F 3/017; G06F 3/046; G06F 3/16; G06F 3/162; G06F 3/165; G06F 3/167; G06F 3/043; G06F 3/0433; G06F 3/0436; G06F 3/03547; G06F 3/03548; G06F 3/016
USPC ............. 381/26, 55, 56, 57, 60, 61, 312, 314, 381/315, 329, 71.6, 72, 74, 79, 91, 92, 112, 381/113, 114, 115, 122, 123; 455/575.2, 455/575.3, 575.4; 345/177
See application file for complete search history.

(56) References Cited

U.S. PATENT DOCUMENTS 6,628,271 B1 9/2003 Matsumoto
6,891,527 B1 5/2005 Chapman
(Continued)

FOREIGN PATENT DOCUMENTS

CN 201044501 4/2008
CN 102016756 4/2011
(Continued)

*Primary Examiner* — Leshui Zhang

(57) ABSTRACT

In some embodiments, a method for processing output of at least one microphone of a device (e.g., a headset) to identify at least one touch gesture exerted by a user on the device, including by distinguishing the gesture from input to the microphone other than a touch gesture intended by the user, and by distinguishing between a tap exerted by the user on the device and at least one dynamic gesture exerted by the user on the device, where the output of the at least one microphone is also indicative of ambient sound (e.g., voice utterances). Other embodiments are systems for detecting ambient sound (e.g., voice utterances) and touch gestures, each including a device including at least one microphone and a processor coupled and configured to process output of each microphone to identify at least one touch gesture exerted by a user on the device.

16 Claims, 4 Drawing Sheets

(51) Int. Cl.
*H04R 1/08* (2006.01)
*H04R 3/00* (2006.01)
*G06F 3/0488* (2013.01)

(56) References Cited

U.S. PATENT DOCUMENTS

| | | | |
|---|---|---|---|
| 7,259,748 B2 | 8/2007 | Ullman | |
| 2003/0217873 A1* | 11/2003 | Paradiso et al. | 178/18.04 |
| 2006/0215847 A1 | 9/2006 | Hollemans | |
| 2006/0247919 A1* | 11/2006 | Specht et al. | 704/201 |
| 2007/0274530 A1 | 11/2007 | Buil | |
| 2008/0130910 A1 | 6/2008 | Jobling | |
| 2010/0202626 A1 | 8/2010 | Shiori | |
| 2010/0329469 A1* | 12/2010 | Shi et al. | 381/56 |
| 2011/0096036 A1* | 4/2011 | McIntosh et al. | 345/177 |
| 2011/0133934 A1* | 6/2011 | Tan et al. | 340/573.1 |

FOREIGN PATENT DOCUMENTS

| | | |
|---|---|---|
| JP | 2001-318691 | 11/2001 |
| WO | 2006075275 | 7/2006 |

* cited by examiner

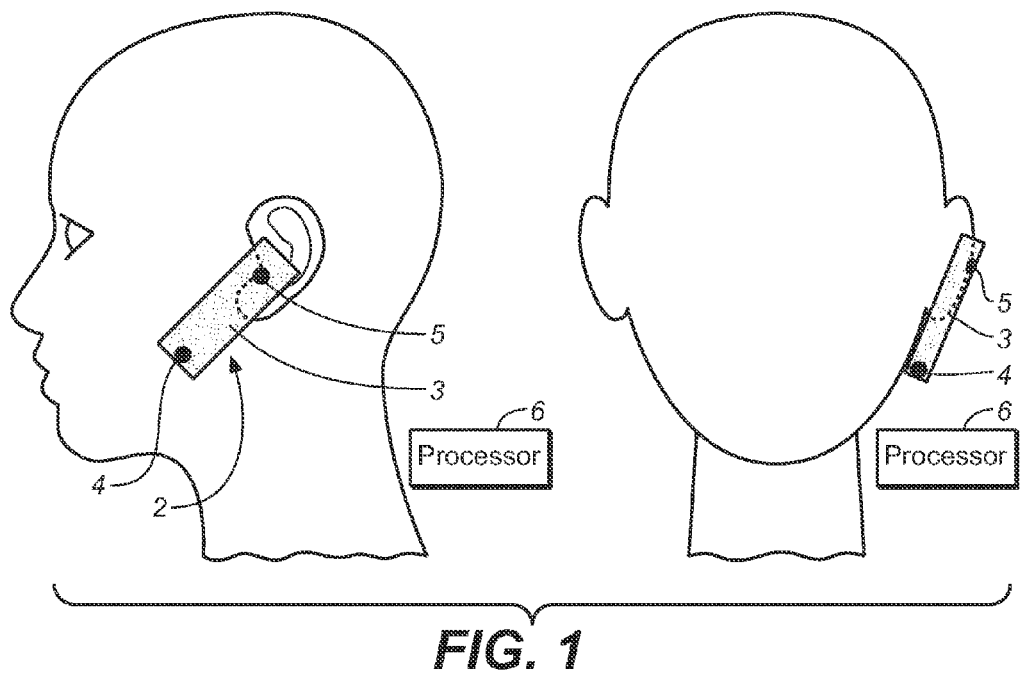
FIG. 1
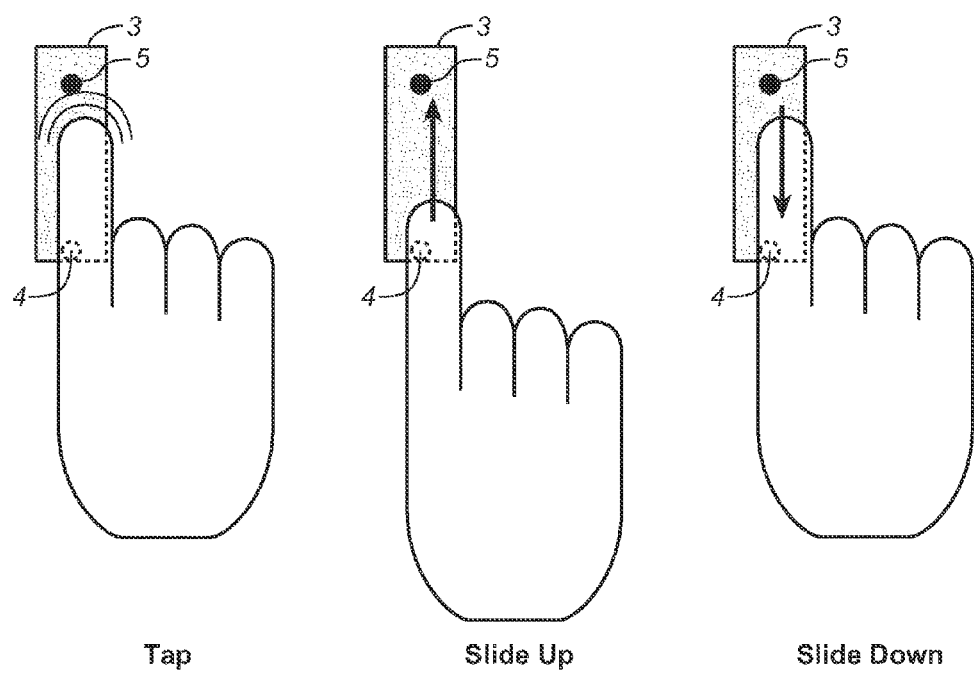
Tap
FIG. 2A
Slide Up
FIG. 2B
Slide Down
FIG. 2C

METHOD AND SYSTEM FOR TOUCH GESTURE DETECTION IN RESPONSE TO MICROPHONE OUTPUT

CROSS REFERENCE TO RELATED APPLICATIONS

This application claims the benefit of priority to related, Provisional U.S. Patent Application No. 61/509,199 filed on 19 Jul. 2011 entitled "Method and System for Touch Gesture Detection in Response to Microphone Output" by Glenn Dickins, et al. hereby incorporated by reference in its entirety.

BACKGROUND OF THE INVENTION

1. Field of the Invention

Embodiments of the invention are systems and methods for detecting touch gestures in response to the output of one or more microphones. In a class of embodiments, the invention is a touch gesture detection system including a device including at least one microphone, and a processor coupled and configured to process the output of each microphone to identify at least one touch gesture (a gesture, by a user of the device, which is or includes a touch by the user on the device).

2. Background of the Invention

Throughout this disclosure, including in the claims, the expression performing an operation "on" signals or data (e.g., filtering, scaling, or transforming the signals or data) is used in a broad sense to denote performing the operation directly on the signals or data, or on processed versions of the signals or data (e.g., on versions of the signals that have undergone preliminary filtering prior to performance of the operation thereon).

Throughout this disclosure including in the claims, the expression "system" is used in a broad sense to denote a device, system, or subsystem. For example, a subsystem that implements a decoder may be referred to as a decoder system, and a system including such a subsystem (e.g., a system that generates X output signals in response to multiple inputs, in which the subsystem generates M of the inputs and the other X-M inputs are received from an external source) may also be referred to as a decoder system.

Throughout this disclosure, "speaker" and "loudspeaker" are used synonymously to denote any sound-emitting transducer.

Throughout this disclosure including in the claims, "microphone" denotes any transducer that generates an electrical signal in response to acoustic input. The acoustic input may be an acoustic signal including longitudinal pressure wave energy and/or shear wave energy (e.g., a surface acoustic wave) that is incident at the microphone, and/or mechanical vibration of the microphone or an object to which the microphone is mounted. For example, a microphone (mounted to a frame) might generate an output signal (an electrical signal) in response to exertion of force (e.g., a touch) to the microphone or frame which causes the microphone to vibrate, or in response to incidence at the microphone of a pressure wave which has propagated through the air to the microphone, or in response to incidence at the microphone of a surface acoustic wave which has propagated via the frame to the microphone.

Throughout this disclosure including in the claims, the expression "touch gesture" denotes a gesture by a user of a device, which is or includes a touch (e.g., a tap, or slide, or other touch) by the user on the device.

Throughout this disclosure including in the claims, the expression "tap gesture" (or "tap") denotes a touch gesture which has a fixed location in space, and a duration in time. The location at which the user exerts a tap and optionally also the duration of the tap may be identified in some embodiments of the present invention.

Throughout this disclosure including in the claims, the expression "dynamic gesture" (or "non-tap" gesture) denotes a touch gesture which is not a tap gesture, and which has a trajectory (a path in space as a function of time) and a duration in time. The trajectory (or a projection of the trajectory on a surface), and optionally also the duration, of a dynamic gesture may be identified in some embodiments of the present invention.

Throughout this disclosure including in the claims, the term "processor" is used in a broad sense to denote a system or device programmable or otherwise configurable (e.g., with software or firmware) to perform operations on data (e.g., video or other image data). Examples of processors include a field-programmable gate array (or other configurable integrated circuit or chip set), a digital signal processor programmed and/or otherwise configured to perform pipelined processing on audio or other sound data, a programmable general purpose processor or computer, and a programmable microprocessor chip or chip set.

Many conventional devices include transducers that allow touch input by a user (e.g., input determined by the position and contact of the user's hand and/or finger). Examples of such devices include those with thin film conductance transducers, capacitive touch screens, capacitive touch transducers, tracking devices (e.g., computer mice), contact arrays, and optical (or visual) transducers. Touch has become an expected mode of device operation.

For many simple devices (e.g., a BlueTooth headset), the required user control interface is very simple in the sense that it must implement only a small number of commands (e.g., power and volume control). Although control of many devices could be elegantly achieved with a proximity or mechanical touch interface (for example a capacitive proximity sensor), the additional cost of a touch sensor can be unwelcome. In typical embodiments of the present invention, microphones already present in a headset (or other device) for use in detecting ambient sound (e.g., voice utterances by a user and/or music) are also used for detecting touch gestures on the device.

BRIEF DESCRIPTION OF THE INVENTION

In a class of embodiments, the invention is a system for detecting ambient sound (e.g., voice utterences by a user and music) and touch gestures. The system includes a device including at least one microphone configured to detect ambient sound, and a processor coupled and configured (e.g., programmed) to process output of each said microphone to identify at least one touch gesture exerted by a user on the device, including by distinguishing the touch gesture from input to the at least one microphone other than a touch gesture intended by the user, and to distinguish between a tap exerted by the user on the device and at least one dynamic gesture (a touch gesture other than a tap) exerted by the user on the device. In typical embodiments, the device is a headset including microphones mounted to a frame and configured to detect voice utterances by a user (and also including at least one speaker), and each identifiable touch gesture is a tap or slide on the frame (or on one or more of the microphones) or an action related to tapping and sliding on the frame or one or more of the microphones. Typically, information (e.g., positional information) inferred from the output of each said microphone, using for example statistical signal properties, relationships and trajectories derived from the set of microphone signals, is used (in some cases, with information regarding the device's geometry and/or surface properties) to classify each touch gesture as one of a set of predetermined categories of movements (of a finger or other object) relative to the device. Typically, the processor is configured to identify (from the output of each said microphone) the occurrence and category of each of at least two dynamic gestures (e.g., a slide in a first direction, and a slide in a second direction opposite to the first direction) exerted on the device as well the occurrence of a tap on the device.

In a class of embodiments, the invention is a method for processing the output of at least one microphone of a device (e.g., the output of microphones in a headset) to identify at least one touch gesture exerted by a user on the device, including by distinguishing the touch gesture from input to the at least one microphone other than a touch gesture intended by the user, and by distinguishing between a tap exerted by the user on the device and at least one dynamic gesture exerted by the user on the device, where the output of the at least one microphone is also indicative of ambient sound (e.g., voice utterances by a user). Herein, the phrase "ambient sound" is used to refer to all audio that is not related to a touch gesture of interest. Optionally, the method also includes a step of controlling the device (or a system including the device) in response to each identified touch gesture. In some such embodiments, the method includes a step of processing the output of the at least one microphone to distinguish between a tap exerted on the device and each of a predetermined set (typically a small set) of dynamic gestures exerted on the device. Typically, the device includes a structure (referred to as a "frame" for convenience) to which each microphone is mounted, and a microphone output signal resulting from a touch (e.g., a tap or slide) on the frame (or directly on at least one microphone) is analyzed to determine whether it exhibits characteristics indicative of one of the gestures of a predetermined set of gestures. The microphone output processing may assume a specific surface texture of the device, to identify the occurrence and characteristics of a touch gesture exerted on the device's surface. Preferably, the characteristics of a candidate touch gesture are matched against a predetermined set (e.g., a small set) of possible gestures to provide a reliable gesture interface. When the device includes at least two microphones mounted to a frame, the processing typically assumes spatial features (e.g., relative locations of microphones mounted to the frame) of the device, and/or a specific surface texture of the device, to identify the occurrence and identify characteristics of a touch gesture exerted on the device's surface.

In accordance with typical embodiments, a touch gesture can be identified and signaled with reasonable sensitivity and specificity from microphone output signal(s). Gesture processing (to identify a gesture in accordance with the invention) can typically be combined with existing audio pre-processing (e.g., noise, spatial and echo processing) on the output of each microphone without a significant increase in processing overhead.

In a second class of embodiments, the invention is a method for processing the output of at least one microphone of a device (e.g., the output of microphones in a headset) to identify at least one touch gesture exerted by a user on the device, including by determining at least one of:

absolute power (or level) of the output of the at least one microphone (e.g., in a suitable frequency band) and/or a characteristic of the power spectrum (e.g., spectral tilt) of said output of the at least one microphone;

a power ratio of outputs of two microphones of the device (e.g., in a frequency band), where the device includes at least two microphones;

a characteristic of the relative power spectrum determined from outputs of two microphones of the device, where the device includes at least two microphones;

peak to average power ratio of said output of the at least one microphone (e.g., using a sliding time window, the ratio of the peak power (e.g., in a suitable frequency band) in the window compared to the average power over the window); and cross correlation peak determined from outputs of two microphones of the device over time (e.g., using a short time cross correlation to determine similarity between the microphone output signals in a moving time window, as a function of time lag applied to one of the output signal, and finding the peak (i.e., the time lag which produces the maximum cross correlation value) for each window, where the device includes two microphones.

In some embodiments in the second class, the method processes the output of the at least one microphone to identify the at least one touch gesture including by determining a combination (e.g., the product or scaled sum) of at least two of said absolute power (or level), power ratio, relative power spectrum characteristic, peak to average power ratio, and cross correlation peak. In some embodiments in the second class, the method also includes a step of including by distinguishing the touch gesture from input to the at least one microphone other than a touch gesture intended by the user. In some embodiments in the second class, the method also includes a step of controlling the device (or a system including the device) in response to each identified touch gesture.

In some embodiments, the inventive method includes a step of microphone output signal analysis and classification (e.g., a wind detector) that alters or disables detection of touch gestures in certain conditions to avoid false touch gesture detection. In some embodiments, the inventive method includes a step of distinguishing a touch gesture executed by a nail of a user's finger from a gesture executed by a pad of a user's finger. In some embodiments, the inventive method includes a step of state based filtering (e.g., using a Hidden Markov model) to improve touch gesture detection performance (e.g., reliability). In some embodiments, the inventive method processes the output of the at least one microphone to identify the at least one touch gesture including by using context or state information, determined from the device, that is not directly related to touch gesture detection (e.g., current volume setting or other current device user settings, current signal level or user activity, and/or other microphone input such as ambient, non-voice noise level).

In some embodiments of the inventive system, the device includes a single microphone. In other embodiments, the device includes two or more microphones, and the processing identifies one dimensional and/or two dimensional gestures. The primary purpose of the microphone(s) of the device may or may not be gesture recognition. Thus, touch gestures by a user (e.g., taps or slides on a frame to which at least one microphone is mounted) may in some cases produce audible noise which may leak into a main audio signal captured by the microphone. For many applications this is not a concern. In some noise conditions, the touch gesture may be obscured by noise, and thus gesture recognition may not work in excessively loud environments. Again, for many applications this is not a concern.

Some sound conditions or unintended physical contact with the device may cause false identification of touch gestures. In a class of embodiments, false gesture identification is minimized. In many applications, false gesture identification will not present a concern.

Aspects of the invention include a system or device configured (e.g., programmed) to perform any embodiment of the inventive method, a touch gesture detection or identification method performed by any embodiment of the inventive system, and a computer readable medium (e.g., a disc) which stores code for implementing any embodiment of the inventive method or steps thereof. For example, the inventive system can include a programmable general purpose processor or microprocessor, programmed with software or firmware and/or otherwise configured to perform any of a variety of operations on data, including an embodiment of the inventive method or steps thereof. Such a general purpose processor may be or include a computer system including an input device, a memory, and a graphics card that is programmed (and/or otherwise configured) to perform an embodiment of the inventive method (or steps thereof) in response to data asserted thereto.

BRIEF DESCRIPTION OF THE DRAWINGS

FIG. 1 is a front view and a side view of an embodiment of the inventive touch gesture detection system, with its headset worn by a user.

FIG. 2A is a diagram of a user executing a tap gesture on the headset of the FIG. 1 system.

FIG. 2B is a diagram of a user executing an upward slide gesture on the headset of the FIG. 1 system.

FIG. 2C is a diagram of a user executing a downward slide gesture on the headset of the FIG. 1 system.

DETAILED DESCRIPTION OF THE PREFERRED EMBODIMENTS

Figure 3:
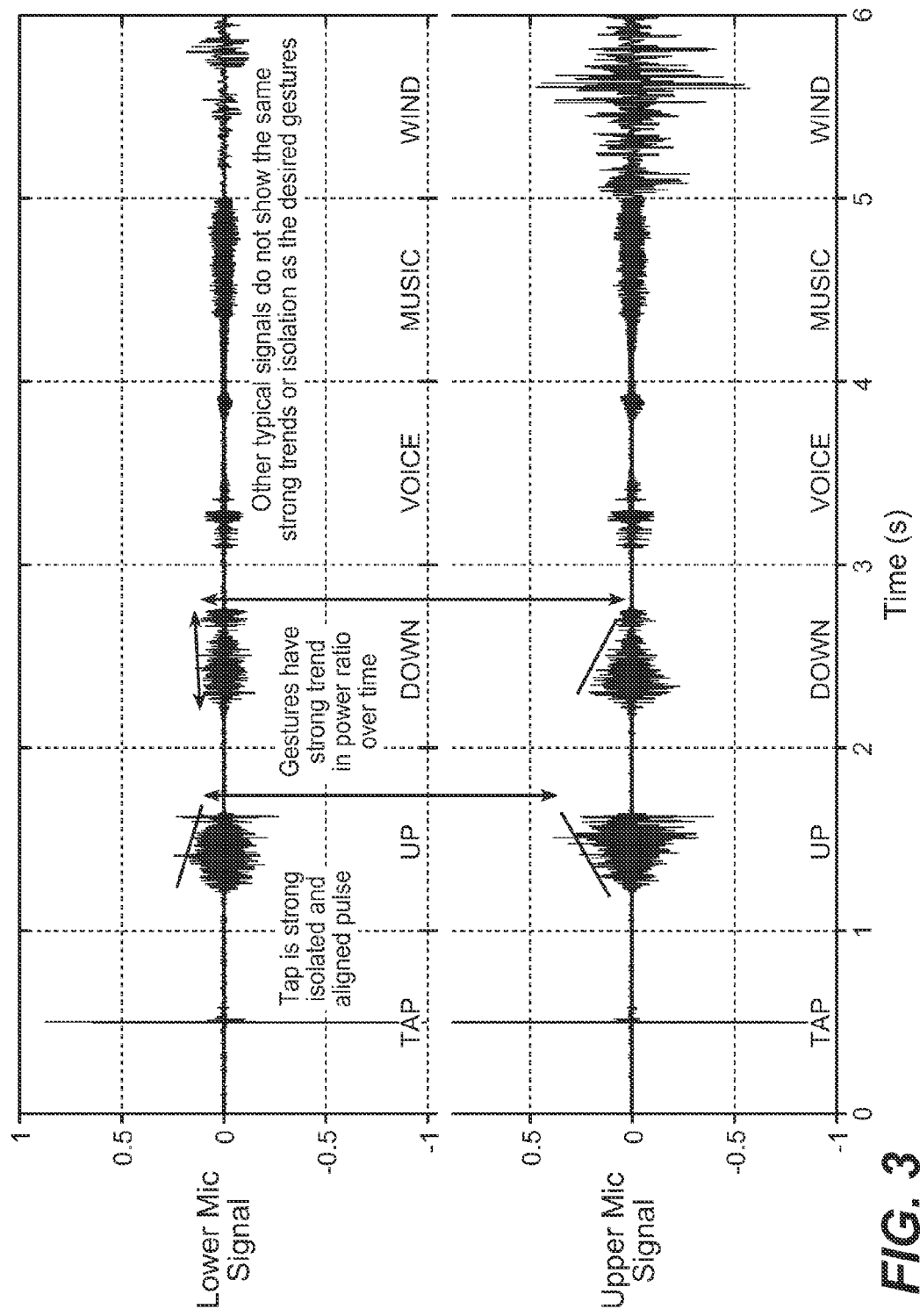
FIG. 3 is a set of two graphs. The upper graph represents an output signal of a microphone of an embodiment of the inventive system, and the lower graph represents an output signal of another microphone of said embodiment of the inventive system.

Many embodiments of the present invention are technologically possible. It will be apparent to those of ordinary skill in the art from the present disclosure how to implement them. Embodiments of the inventive system and method will be described with reference to FIGS. 1-5.

With reference to FIG. 1, we describe an embodiment of the inventive system which includes headset 2 and processor 6. FIG. 1 shows front and side views of a user wearing headset 2. Headset 2 includes two microphones (4 and 5) mounted to the headset's elongated frame (3) and a speaker (not shown) also mounted to frame 3 near the user's ear. One end of frame 3 supports microphone 5 near the user's central ear position. Microphone 4 is spaced from microphone 5 along frame 3's longitudinal axis. Processor 6 is coupled to headset 2 by a wireless link (e.g., a Bluetooth link), and the output of microphones 4 and 5 is asserted over the link to processor 6. FIG. 1 shows only one exemplary embodiment. Many alternative microphone placements are possible and implemented in headset devices and other systems that embody the invention. Often the microphones of a headset are oriented in a line directed approximately towards the user's mouth, however the further microphone from the user's mouth is not necessarily outside the effective center of the ear canal as shown in FIG. 1. Possible designs include more than two microphones, and arrays or microphones located diversely around the ear and towards the user's mouth.

In a variation on the system shown in FIG. 1, the processor which performs the inventive method is integrated with a device (e.g., headset) including at least one microphone whose output is processed in accordance with the invention, or is coupled with such a device by a link other than a wireless link.

Headset 2 can be implemented in a conventional manner, or it can be implemented with a surface (e.g., of a type described below) designed to improve the reliability with which processor 6 can identify touch gestures from the outputs of microphones 4 and 5.

Processor 6 may be implemented as a programmable digital signal processor (DSP) that is programmed and otherwise configured to perform required processing on the output of microphones 4 and 5, including performance of an embodiment of the inventive method on samples of the output signal(s) of microphones 4 and 5. Alternatively, processor 6 may be a programmable general purpose processor (e.g., a PC or other computer system or microprocessor, which may include an input device and a memory) which is programmed with software or firmware and/or otherwise configured to perform any of a variety of operations including an embodiment of the inventive method.

In operation of the FIG. 1 system, microphones 4 and 5 are used in a conventional manner to detect ambient sound (e.g., voice utterences by a user and music). For example, the outputs of microphones 4 and 5 may be amplified, sampled, encoded, and transmitted to a receiver (in a conventional manner), and the receiver may then decode the transmitted data and generate signals from the decoded data which drive speakers such that a listener can detect from the speakers' acoustic output ambient sound (e.g., voice utterences by the user of headset 2) originally detected by microphones 4 and 5. In many cases, the output of microphones 4 and 5 is processed to achieve an amount of signal extraction for the desired signal, typically including the voice of the user. Such processing is common and techniques are well known to the art and not of relevance to this invention. The invention can be embodied in a system in which there is substantial additional processing of microphone signals to separate a voice (or other intended) signal from the undesired background noise around the user. It is a feature of some embodiments of the invention that touch gesture detection utilizes aspects of this other processing, such as a frequency domain transform or filterbank, to achieve a low additional complexity for gesture detection. In operation of the FIG. 1 system, the outputs of microphones 4 and 5 are also used in accordance with the invention to identify an indication that the user has executed touch gestures on headset 2 and to distinguish between such gestures.

In a typical implementation of the FIG. 1 system, processor 6 is programmed and otherwise configured to process the output of microphones 4 and 5 to identify an indication that the user has made one of three simple touch gestures (a tap on headset 2, or one of two different dynamic gestures exerted on frame 3) and to distinguish between these gestures. Processor 6 is configured to identify a tap on frame 3 (e.g., a tap by a user's finger as shown in FIG. 2A) or a tap executed directly on microphone 4 or 5. Processor 6 is also configured to identify (and distinguish between) the following dynamic gestures: an upward finger slide (on frame 3) from a point relatively nearer to microphone 4 (than to microphone 5) toward microphone 5 as indicated in FIG. 2B; and a downward finger slide (on frame 3) from a point relatively nearer to microphone 5 (than to microphone 4) toward microphone 4 as indicated in FIG. 2C.

Processor 6 is programmed to analyze the output signals received from microphones 4 and 5 to identify occurrences of each of the three gestures (tap, upward slide, and downward slide) and to distinguish each of them from other normal signal conditions (which may include acoustic input to microphones 4 and 5 due to the user's voice, or music, or wind). FIG. 3 represents exemplary outputs of microphones 4 and 5 in response to each of these six signal cases.

The lower graph of FIG. 3 represents the output signal produced by upper microphone 5 of FIG. 1 in response to a tap gesture ("TAP"), followed by an upward slide gesture ("UP"), followed by a downward slide gesture ("DOWN"), followed by a voice utterance by the user, followed by ambient music, and finally input due to wind blowing on the headset. The upper graph of FIG. 3 represents the output signal produced by lower microphone 4 of FIG. 1 in response to the same sequence of six inputs: a tap gesture ("TAP"), followed by the same upward slide gesture ("UP"), and then the same downward slide gesture ("DOWN"), the same voice utterance by the user, the same music, and finally the same acoustic input due to wind.

It is evident from FIG. 3 that the statistical properties of the microphone signals produced in response to the six inputs are distinct. Accordingly, processor 6 can be programmed in accordance with embodiments of the invention to detect and classify an occurrence of any of the three user touch gestures in a reliable and efficient manner, even in the presence of one or more of the other three types of input. More specifically, processor 6 is programmed in accordance with an embodiment of the invention to perform coarse analysis of signals of the type graphed in FIG. 3 to identify as a "tap" gesture a discrete isolated pulse in one microphone output (e.g., microphone 4's output) which coincides (e.g., within a predetermined, short time window) with a discrete isolated pulse in the other microphone's output (e.g., microphone 5's output), where each pulse has amplitude greater than a predetermined threshold value (e.g., a threshold value representing a normal signal level or power, e.g., an average amplitude or power of the signal in response to "non-tap" inputs). Much of a microphone's output in response to a tap may be due to mechanical vibration, and thus the phase alignment of the signals from microphones 4 and 5 in response to a tap on frame 3 may be related to mechanical coupling (by frame 3) as well as acoustical coupling. In some embodiments, processor 6 identifies a user tap on device 2 as the occurrence of an isolated pulse or spike (exceeding a threshold value) in the signal from microphone 4, which is aligned with (e.g., occurs within a short predetermined time window of) an isolated pulse or spike (exceeding the threshold value) in the signal from microphone 5.

In some embodiments, processor 6 is programmed to identify an up (or down) sliding gesture as a significant change in a ratio of power of the outputs of microphones 4 and 5 (e.g., over a predetermined minimum time or during a time window of predetermined duration). With reference to FIG. 3, a running average (over a window having a very short duration, e.g., a window of 0.02 second duration) of the power of the output of microphone 4 decreases with time during the interval from about Time=1.3 sec to about Time=1.7 sec, and a running average (over the same window) of the power of the output of microphone 5 increases with time over a slightly larger interval (from about Time=1.2 sec to about Time=1.7 sec). Thus, the ratio of the average power of microphone 4's output to that of microphone 5 decreases over the time interval from about Time=1.3 sec to about Time=1.7 sec, which can be identified by processor 6 as an occurrence of an "upward slide" gesture (a slide of a user's finger from a point on frame 3 near microphone 4 toward microphone 5). Similarly, the ratio of the average power of microphone 4's output to that of microphone 5 increases over the interval from about Time=2.3 sec to about Time=2.7 sec, which can be identified by processor 6 as the occurrence of a "downward slide" gesture (a slide of a user's finger from a point on frame 3 near microphone 5 toward microphone 4).

A change in the power ratio of the two microphones' outputs (over a predetermined minimum time or during a time window of predetermined duration) is unusual in the sense that it would rarely occur (in such a structured way as in the intervals from Time=1.3 sec to Time=1.7 sec, and Time=2.3 sec to Time=2.7 sec of FIG. 3) in response to expected (or typical) acoustic input to the microphones other than a slide gesture (e.g., voice, music, wind, or a user tap). Thus, processor 6 may be programmed in accordance with some embodiments of the invention to identify such a power ratio shift as a result of a slide gesture (along the line segment joining the two microphones) which moves away from one microphone and toward the other. A slide gesture (e.g., a user's finger slide along frame 3 between microphones 4 and 5) would typically also result in microphone signals that are loud relative to those that would be produced in response to normal voice and/or ambient music (or external noise). Thus, processor 6 is programmed in some embodiments to identify an increase (or decrease) in the ratio of the average power of microphone 4's output to that of microphone 5 (over an interval of predetermined minimum duration or during a time window of predetermined duration) as a slide event only if the average power of each microphone's output signal exceeds a predetermined threshold value during the relevant time interval.

The outputs of microphones 4 and 5 in response to voice (the signals in the time interval labeled "VOICE" in FIG. 3), ambient music (the signals in the time interval labeled "MUSIC" in FIG. 3), and wind (the signals in the time interval labeled "WIND" in FIG. 3) do not exhibit the same strong trends and isolation as do the microphone outputs (of FIG. 3) that result from tap and slide gestures.

The outputs of microphones 4 and 5 in response to wind (the signals in the time interval labeled "WIND" in FIG. 3) may exhibit random correlation that resembles in some respects the correlation resulting from a tap or slide gesture. To avoid identifying such random correlation as a touch gesture, in some embodiments processor 6 is programmed to implement a wind detector (e.g., to identify microphone output signal average power in excess of a predetermined threshold, over an interval longer than the assumed duration of a gesture, as being the result of wind, or implement a more elaborate detection mechanism) and/or heuristics that prevent an event (indicated by the output of one or more microphones) from being identified as a touch gesture unless the event is isolated, from each time interval in which a relevant microphone output signal (e.g., in response to wind) exceeds a predetermined threshold, by at least a predetermined minimum time interval before and after the event. With processor 6 programmed in this way, it may not be possible to identify touch gestures occurring during wind distortion. However, this is not a problem in many applications.

Figure 4:
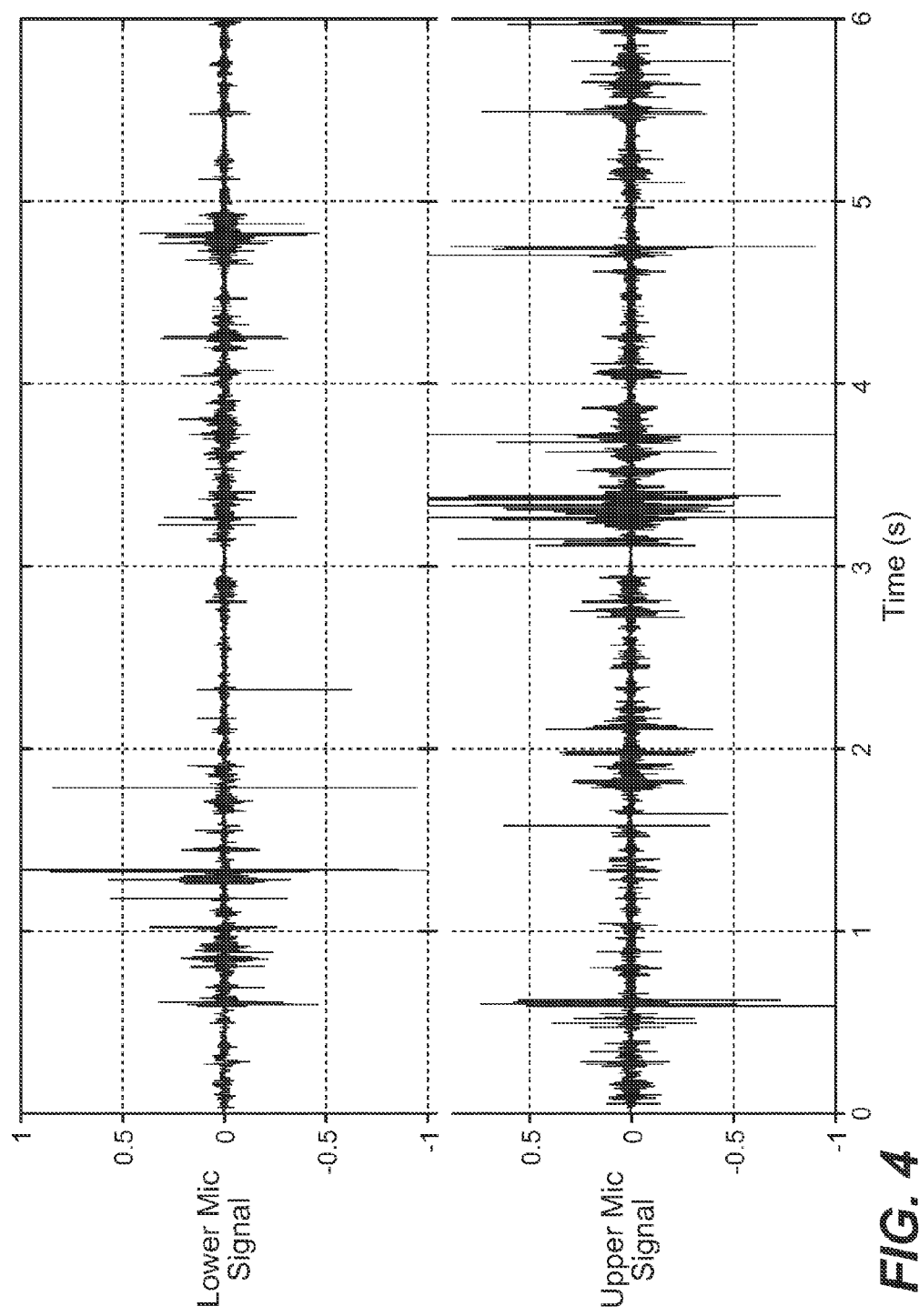
FIG. 4 is a set of two graphs. The upper graph represents an output signal of a microphone of an embodiment of the inventive system, and the lower graph represents an output signal of another microphone of that embodiment of the inventive system.

The lower graph of FIG. 4 represents the output signal of upper microphone 5 of FIG. 1 in response to a sequence of non-gestural (random or casual) physical contacts (not intended as gestures) between device 2 and a user's fingers. The upper graph of FIG. 4 represents the output signal of lower microphone 4 of FIG. 1 in response to the same sequence of non-gestural physical contacts. It is apparent from comparison of the envelopes of the signals plotted in FIG. 4, with those (plotted in FIG. 3) resulting from tap and slide gestures by the user, that processor 6 (or another processor) can be programmed in accordance with the invention to distinguish the structure and characteristics of the signals resulting from the deliberate tap and slide gestures from those resulting from the non-gestural contacts. A degree of tuning of (or machine learning by) processor 6 may be required to configure the processor to have a high degree of sensitivity to specific touch gestures intentionally exerted by a user on device 2 and immunity to non-gestural physical contacts on device 2.

More generally, user interfaces which implement embodiments of the present invention can perform effectively and conveniently in typical applications although they do not implement machine learning techniques. It will be apparent to those of ordinary skill in the art that these embodiments can be further refined and improved by implementing standard statistical signal processing and machine learning techniques.

Figure 5:
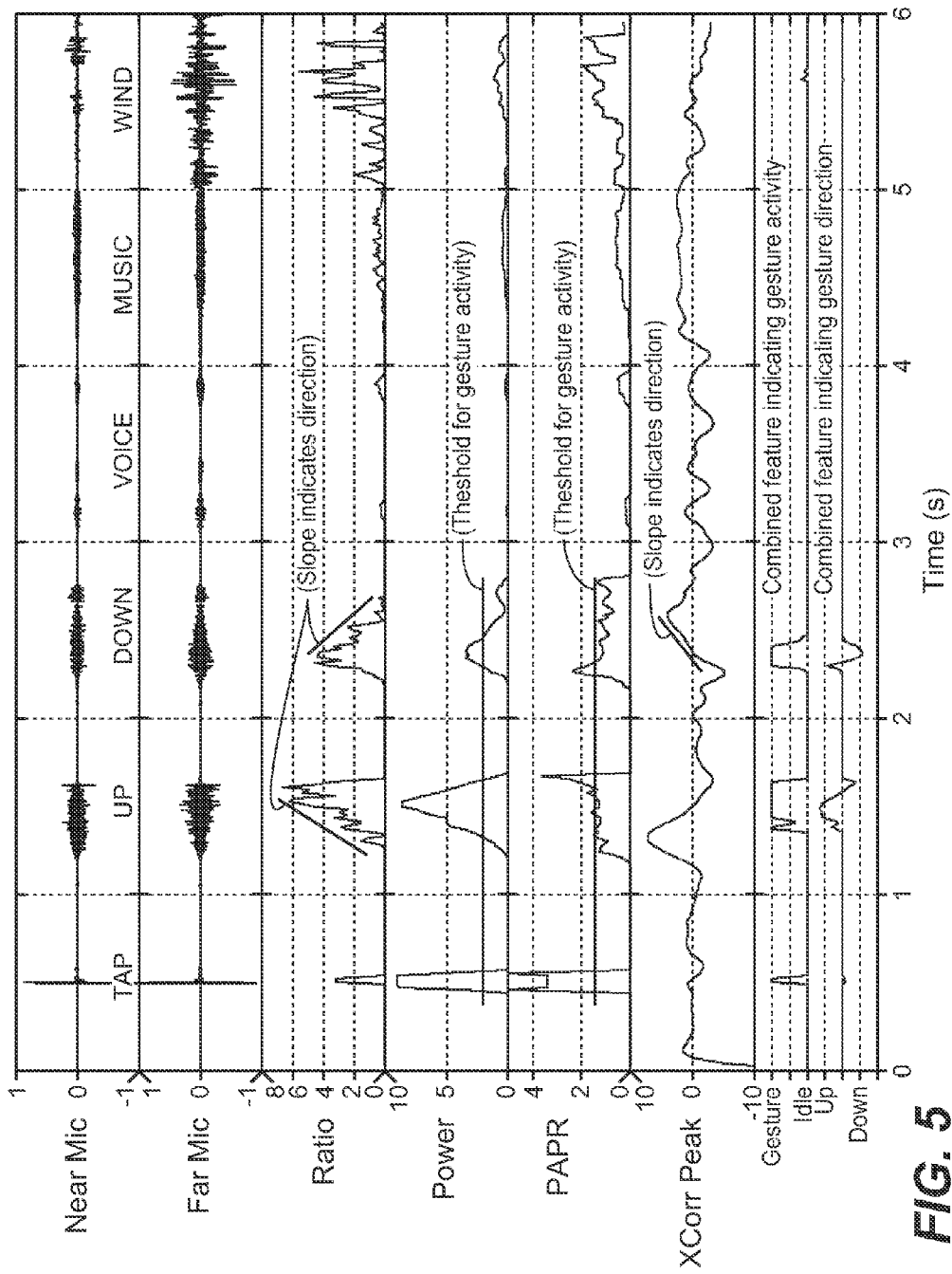
FIG. 5 is a set of graphs. The upper graph is the waveform of a first output signal of a microphone of an embodiment of the inventive system, which is generated simultaneously with a second output signal (whose waveform is shown in the second graph from the top of FIG. 5) of another microphone of the same system. The other graphs represent signals generated by processing the first output signal and the second output signal.

With reference to FIG. 5, we next describe some of the features and cues that may be indicated by microphone output(s) and used to isolate and identify touch gestures (e.g., to distinguish tap gestures from dynamic gestures and distinguish between different types of dynamic gestures) in some embodiments of the inventive method and system. The trends and measures for these features and cues are of interest over a time scale related to the expected duration of the relevant touch gesture(s).

The upper graph in FIG. 5 shows a simple test sequence of three gestures and some typical normal signal conditions. More specifically, the upper graph of FIG. 5 represents the output signal produced by upper microphone 5 of FIG. 1 in response to a tap gesture ("TAP"), followed by an upward slide gesture ("UP"), followed by a downward slide gesture ("DOWN"), followed by a voice utterance by the user, followed by ambient music, and finally acoustic input due to wind blowing on the headset. The second graph (from the top) of FIG. 5 represents a second output signal, produced by lower microphone 4 of FIG. 1 in response to the same input sequence.

The other graphs in FIG. 5 represent signals generated by processing the microphone output signals (produced by microphones 4 and 5 of FIG. 1 in response to the noted input sequence. It can be seen that the features of these graphs offer sensitivity and specificity to the TAP, UP, and DOWN gestures. Processor 6 (or another processor) can be programmed to identify and use a combination of these features to implement an overall detector and classifier of the touch gestures.

The third graph in FIG. 5 (labeled "Ratio") is the power ratio of the output of the far microphone to the near microphone for energy in a frequency band ranging from 200 to 1,400 Hz. The ratio is plotted in dB versus time. The noted frequency range is not restrictive of the invention, and is presented as an example of a useful range. Generally, it has been found that a spectral weighting predominantly positioned in the range from 100 Hz to 3 kHz is of use. In the example, the ratio is always positive indicating that the further microphone has a larger gain than the closer microphone in this specific example. It should be noted that the individual gains and orientations of the microphones will change in various embodiments, and thus the range of values and the trajectory that the Ratio will take is dependent on device properties. To produce the third graph in FIG. 5, a normalization is used in the ratio such that it only diverges from unity (0 dB) for a significant power signal produced by the microphones, so that the graphed Ratio is $$PowerRatio = \frac{Power_1 + Power_{Min}}{Power_2 + Power_{Min}}.$$

This mapping reduces the activity of the features indicated by the graph to only loud signals, with the PowerRatio asymptotically approaching unity for small powers. A suggested range of values for $Power_{Min}$ would be −50 dB to −20 dB against the maximum possible input power in the analyzed frequency band. This simple method creates a specificity of the PowerRatio to input resulting from deliberate or significant touching of device 2 by a user.

The power ratio feature is both useful as an indicator of gesture activity, and the trajectory of the ratio over time is an indicator of the direction of a dynamic gesture (e.g., an UP or DOWN slide gesture). If the ratio of the power (or level) of the output signals from a pair of microphones of the inventive system is considered across one or more frequency bands, processor 6 (or another processor) may be programmed in accordance with some embodiments of the invention to identify as a dynamic gesture a strong trend of the ratio (in a particular direction related to the direction of the gesture). Since there is typically inherent random activity in the fricative movement of the touch point of such a gesture (on the device to which the microphones are mounted), it is typically not possible to infer the position of the touch point at any instant in time only from the power (or level) magnitude ratio (as a function of time). However, in a class of embodiments, a properly weighted ratio estimate with noise immunity (to low power signal) indicates a trend that is in turn indicative of the direction of a sliding gesture.

More generally, features related to overall spectral shape, such as spectral tilt may be of advantage in detecting the presence of touch gestures.

The fourth graph in FIG. 5 (labeled "Power") is the absolute power level of the signal output from microphone 5 in a suitable band (in this case 200 to 1,400 Hz). It is apparent from the graph that absolute power level is a good indicator of significant signal and thus touch gesture activity near the microphones of device 2 (e.g., processor 6 may identify each occurrence in which the absolute power level exceeds a predetermined threshold value as a touch gesture). Since a touch gesture will typically be applied close to a microphone, the absolute power (or level) of a microphone output signal produced in response to such a gesture is an indicator of occurrence of the gesture, especially where the device surface that is touched has a texture (e.g., a rough texture) sufficient to produce detectable sound and mechanical vibrations whose amplitude depends in a predictable, detectable way on the force exerted thereon.

Particular gestures, especially those involving a tap (e.g., a percussive touch) on a device (including at least one microphone), create a very large impulse which has a characteristic large peak to average power ratio. It is evident that other features may be useful for further discrimination, however the features listed in this invention are shown to have useful and sufficient discrimination power and rank above other features in terms of utility towards the classification purpose.

More generally, the time (or phase) at which a peak occurs in a microphone output signal due to a dynamic gesture can trend with the changing position of the touch due to changing time of arrival (at the microphone) of the acoustic or mechanical input. In some embodiments (e.g., some in which a device includes only a single microphone), the trend over time of absolute power (or level) of a microphone output signal produced in response to a sliding gesture is used to indicate occurrence of the sliding gesture and to indicate whether the gesture is exerted on the device toward or away from the microphone.

The fifth graph in FIG. 5 (labeled "PAPR") is the Peak to Average Power Ratio of the signal output from microphone 5. Using a sliding time window of duration equal to about 112 ms (7 blocks of samples at a 16 ms block rate), this feature is the ratio on a linear scale of the peak power (in the 200 to 1,400 Hz frequency band) in any one window compared to the average power over that window. The abrasive and impactful nature of touch gestures can create a significant signal in this feature. It is apparent from the graph that PAPR is a good indicator of significant signal and thus touch gesture activity near the microphones of device 2 (e.g., processor 6 may identify each occurrence in which PAPR exceeds a predetermined threshold value as a touch gesture).

The sixth graph in FIG. 5 (labeled "XCorr Peak") is a plot of Cross Correlation Peak determined from the outputs of the two microphones over time. This feature is related to the phase or relative time of arrival between the two microphones. In this example it is calculated using a short time cross correlation (to determine similarity between the two microphone output signals in a short, moving time window, as a function of time lag applied to one of the output signal) and finding the peak (i.e., the time lag which produces the maximum cross correlation value) for each window. The time lag which produces the maximum cross correlation value (for each time window) is plotted versus time (the center of each window) in FIG. 5. The direction of this feature is an indicator of the direction (relative to one of the microphones) of a dynamic gesture. A strong trend in the delay (the lag times plotted in FIG. 5) indicates a slide gesture, and the slope of the trend indicates the direction of the slide (e.g., a trend of sufficient duration having negative slope in the fifth graph of FIG. 5 indicates an UP slide gesture, and a trend of sufficient duration having positive slope in the fifth graph of FIG. 5 indicates a DOWN slide gesture).

In some embodiments of the invention, a full windowed cross correlator delay estimation is implemented on a pair of microphone output signals produced in response to a sliding gesture, and the result is analyzed to indicate occurrence and direction of the sliding gesture. The banded cross correlator could be achieved in different ways including the analysis of the phase trajectory or group delay across multiple frequency subbands.

Processor 6 can be programmed to determine a combined gesture indicator, e.g., the product (as a function of time) of the three Ratio, Power, and PAPR features. The seventh graph in FIG. 5 (plotted on a scale from a minimum value, "Idle," to a maximum value, "Gesture") is a plot of such combined gesture indicator (the product of the Ratio, Power, and PAPR features). The combined gesture indicator is scaled and thresholded (in the sense that a suitable threshold value of a scaled version of the indicator is identified, and an occurrence in which the scaled indicator exceeds the threshold value is identified as a touch gesture) to remove some of the noise and achieve a suitable selectivity and sensitivity for gestures.

The eighth graph in FIG. 5 (plotted on a scale from a minimum value, "Down," to a maximum value, "Up") is a plot of another combined gesture indicator: a scaled sum of the derivative of filtered versions of the Ratio and XCorr Peak features. This combined gesture indicator is indicative of occurrence and direction of each dynamic gesture (i.e., the direction of the UP gesture and that of the DOWN gesture). The initial features are calculated using a transform that has a 16 ms block rate. Thus a value of XCorr and Ratio is available every 16 ms. Any block rate in the range from 10 ms to 80 ms would also be suitable for the application. To produce the eighth graph in FIG. 5, the filtered derivative of each feature signal is calculated with a 100 ms time constant, but could alternatively be calculated with another time constant in range of filtering or smoothing time constants from 50 ms to 200 ms.

From the FIG. 5 example, it can be seen that touch gestures can be easily identified as separate from normal voice, ambient music (noise) or wind activity. It is expected, however, that significant physical activity around the device, such as during placement on the head or ear, adjustments and the like, would trigger some level of false alarms in a preliminary gesture detection.

For this reason, some embodiments of the inventive method include at least one additional step to reduce the occurrence and impact of such false detections. For example, the method can implement a technique such as a state based model (e.g., Hidden Markov Model) to create a sensible filter around the frequency and activity of preliminarily detected touch gestures. The control rate cannot be arbitrarily fast (only one or two gestures per second would be typically expected from real input). Furthermore, the context of the device, such as previous gestures detected, current operating mode, current volume, level of the output signal, environmental conditions such as orientation and noise, and the detection of ongoing disturbances such as wind or physical movement can all be used to infer likelihood of a preliminarily detected gesture being a touch gesture intended by a user (and optionally also to infer the type of gesture most likely to have been intended by the user at that time).

Use of a state based filtering approach can improve general touch gesture detection reliability. Such filtering can take advantage of the components and expected rate of touch gesture activity to filter out unwanted false detections. For example, a hidden Markov model could be used to model different audio gestures. In particular, the dynamic nature of an up or down slide gesture can be well captured by a hidden Markov model.

To improve the reliability with which a slide gesture can be classified, some embodiments add more state information and constraints or assumptions to the model during the gesture classification. For example, if a possible slide gesture (a slide-like gesture) is observed, in deciding whether it is an slide up or slide down, processor 6 could draw on additional state information such as the current preset volume, the received speech level, the current level of the signal output to the speaker, and the ambient noise level. Such information could be useful for classifying ambiguous cases. As an example, if the ambient noise level is high or has recently increased, processor 6 could be programmed to increase the likelihood that an ambiguous gesture (e.g., a slide gesture) is in fact a gesture intended to increase the device volume (e.g., a slide gesture in a direction which would trigger an increase in device volume).

In many applications an occasional false gesture detection is not overly problematic. For example in the case of headset volume control in response to a detected touch gesture, a small adjustment in volume due to a single false gesture detection may go unnoticed by the user. Still, it is typically desirable to keep false detections to a minimum.

Typically, false detections of touch gestures or missed gesture detections will be most likely to occur in extremely loud environments, during severe wind activity, or during handling of the device that is not intended as exertion of a touch gesture thereon. As noted above, it is possible to significantly reduce the noise from preliminary gesture estimates with appropriate filtering. Given the application, the danger or impact of a false touch gesture detection is quite low, and thus, despite being an apparent difficult and noisy form of input, in practice touch gestures can offer a point of control and usability without any additional hardware where the benefits of such an implementation would far outweigh the impact of any false control in extreme cases.

Typically, the inventive method also includes a step of controlling a device or system (e.g., the device which includes one or more of the microphones whose output is processed to identify a touch gesture, or a system including such device) in response to each identified touch gesture. For example, processor 6 of the FIG. 1 system may be configured to perform such an embodiment by generating (in response to detected touch gestures) control signals for controlling the volume of the output of the speaker of headset 2. More generally, in embodiments in which a device (e.g., a headset or other small audio device) includes at least one microphone whose output is processed to identify a touch gesture, the detected touch gestures may be used for low speed control functions (e.g., volume control).

In the case that the inventive system includes a device having multiple microphones, the device may have a textured surface whose texture creates an increased acoustical or mechanical vibration during a touch gesture. This improves the reliability of gesture detection. One example of a demonstrative texture surface that achieves this is sandpaper. A coarse surface is generally preferred for touch gesture definition.

In some embodiments of the inventive system that include a device having a single microphone, the spatial definition provided by a textured surface of the device may be limited. A trend in microphone output signal power over time will give an indication as to whether a dynamic gesture is toward or away from the single microphone. However, false identification of such a dynamic gesture may be easily triggered by other signals that are naturally decreasing or increasing in power over time.

The surface of a device (which includes at least one microphone whose output is processed to identify a touch gesture) may have a characteristic pattern or texture which can be used to advantage. This is particularly useful for the single microphone case. For example, the device could have a surface with a pattern of repeating small scale surface features (e.g., velcro-like or zipper-like features), with the period of the surface pattern changing across the device surface. A touch gesture (as indicated by microphone output) in this case would have an indicative pitch range and trend in pitch across the device that could be used to indicate direction of a dynamic gesture.

In some embodiments, the touch gestures detected by the inventive system include at least one touch gesture in which a user's fingernail touches a device, where the device includes at least one microphone whose output is processed to detect the gestures. In some such embodiments, a gesture executed by the nail of a user's finger is distinguished from a gesture executed by the pad of a user's finger by the use of appropriate features of a microphone output signal produced during the detected gesture (e.g., the distinction can be made by analyzing the spectral envelope of the microphone output signal during the detected gesture). In particular, it is noted that a gesture made with a nail has a larger content at higher frequencies.

In some embodiments, two-dimensional dynamic gestures (having a two-dimensional trajectory across a device surface) are detected and classified. Although resolution may be limited, it may be possible to detect and distinguish between a useful set of distinct dynamic gestures of this type. It will be evident from the present disclosure that the two-dimensional dynamic gesture detection could use an appropriate combination of textures and microphones to identify possible fricative gesture trajectories that could have caused a detected signal.

In some embodiments, robustness against false touch gesture identification due to microphone input (e.g., wind) other than intended touch gestures is obtained using a combination of microphone signal activity detection (such as detecting the presence of ongoing wind), and heuristic or grammar rules around the touch interface. As with any sensory interface a degree of tolerance of errors should be designed into the interface and user interface paradigm. In many applications, the simple gesture identification provides a robust and convenient way of controlling functions such as power and volume control.

Since touch gestures typically create a significant microphone output signal, they may be difficult to remove from the microphone output signal (after touch gesture identification in accordance with the invention) before the signal is used for its conventional purpose. Though an attenuation to the microphone signal (due to a touch gesture) could be applied once the touch gesture is recognized, there will typically not be enough time available to do this (without introducing undesirably latency into the microphone output signal processing). In practice, for the multi-microphone case, there will often be some form of conventional noise or spatial beam-forming or suppression in place. The proximity and characteristic response of the touch gesture may be substantially suppressed by this processing. Even if this were not the case, the touch gestures in many applications are infrequent during the device use (for example during a phone call using a Bluetooth headset). Touch gesture noise may be limited in occurrence and no worse than if the user were to touch the device during use, which is a common and accepted occurrence for which the rest of the system must be tolerant. Additionally, subsequent signal processing is likely to add a degree of compression or limiting, such that although the touch gestures may be significantly louder than normal voice signal indicated by the microphone signal(s), after the subsequent processing the residual sound of the touch gestures will be moderated. In this way, in a typical scenario, the presence of the audio related to occasional touch gestures on the device does not preclude the use of the audio for processing and subsequent communications or other audio application.

Aspects of typical embodiments of the invention include the following:

a system and method for recognition and classification of touch gestures on a device (e.g., a compact device) including one or more microphones, using signal features of the output signal of at least one said microphone;

such a system and method, wherein the device includes at least two microphones and one of the features used is a trend in the ratio of the microphone signal power or amplitude across one or more frequency bands (over a time window related to the expected duration of a gesture), or wherein the device includes at least one microphone and one of the features used is the absolute power of the microphone signal across one or more frequency bands over a time window related to the expected duration of a gesture, or one of the features used is the ratio of peak microphone signal to average power for the full microphone signal or across one or more frequency bands over a time window related to the expected duration of a gesture, or (where the device includes an array of microphones) one of the features is the trend in the relative phase of the signals across the microphone array across one or more frequency bands over a time window related to the expected duration of a gesture, or (where the device includes two microphones) one of the features is the trend of the instantaneous time indexed cross correlation between the two microphone output signals calculated on the full signal or a partial filtered signal band over a time window related to the expected duration of a gesture, or one of the features is the trend of a pitch estimator related to a designed surface texture on the device and the pitch trajectory is considered over a time window related to the expected duration of a gesture;

such a system and method, where the device includes two microphones, and a characteristic of the relative power spectrum (determined from the outputs of the microphones) is used to detect and differentiate gestures. To determine the relative power spectrum, data indicative of relative power (as a function of time) of the outputs of the microphones is determined, and a time-to-frequency domain transform (e.g. cosine or Fourier transform) is performed on the data;

such a system and method, where the device has a surface having a texture or surface treatment that enhances the ability to detect a touch gesture from the output of at least one microphone of the device;

any of the above, with the addition of a set of rules that govern a sensible rate and sequence of touch gestures to avoid false detections or missed gestures;

any of the above, with the addition of signal analysis and classification (e.g., a wind detector) that may alter or disable the detection of gestures in certain conditions to avoid false touch gesture detection;

any of the above, where a gesture executed by the nail of a user's finger is distinguished from a gesture executed by the pad of a user's finger by the use of appropriate spatial features (e.g., where the distinguishing is related to the spectral envelope of a microphone output signal during the detected gesture);

any of the above, with the use of state based filtering (e.g., a Hidden Markov model) to improve touch gesture detection performance (e.g., reliability); and any of the above with the additional use of context or state information determined from the device that is not directly related to touch gesture detection (e.g., current device user settings, current signal level or user activity, and/or other microphone input such as ambient noise level).

In some embodiments, the processor of the inventive system is a programmable digital signal processor (DSP) programmed and/or otherwise configured to perform processing, including steps of an embodiment of the inventive method, on data indicate of the output signal(s) of at least one microphone. For example, processor 6 of FIG. 1 may be implemented as such an appropriately configured DSP. Alternatively, the processor of the inventive system is a programmable general purpose processor (e.g., a PC or other computer system or microprocessor, which may include an input device and a memory) which is programmed with software or firmware and/or otherwise configured (e.g., in response to control data) to perform any of a variety of operations including an embodiment of the inventive method. For example, processor 6 of FIG. 1 may be implemented as an appropriately programmed microprocessor or other programmed general purpose processor. A general purpose processor configured to perform an embodiment of the inventive method would typically be coupled to an input device (e.g., a mouse and/or a keyboard), a memory, and a display device.

Another aspect of the invention is a computer readable medium (e.g., a disc) which stores code for implementing any embodiment of the inventive method or steps thereof.

While specific embodiments of the present invention and applications of the invention have been described herein, it will be apparent to those of ordinary skill in the art that many variations on the embodiments and applications described herein are possible without departing from the scope of the invention described and claimed herein. For example, examples mentioned herein of time and/or frequency domain processing (and/or time-to-frequency transformation) of signals (e.g., microphone output signals) are intended as examples and are not intended to limit the claims to require any specific type of processing and/or transformation that is not explicit in the claims. It should be understood that while certain forms of the invention have been shown and described, the invention is not to be limited to the specific embodiments described and shown or the specific methods described.

What is claimed is:

1. A method for identifying at least one touch gesture exerted by a user on a device, wherein the device is a headset which includes at least two microphones configured to detect ambient sound, said method including the step of:
   (a) processing outputs of the microphones of the device to identify the at least one touch gesture exerted by the user on the device, including by determining a cross correlation peak as a function of time between the outputs of two of the microphones, and identifying at least one said touch gesture as a dynamic gesture exerted by the user on the device, in response to identifying a trend over time in values indicative of said cross correlation peak as a function of time; and
   wherein the step (a) includes determining a slope of the trend over time in said values indicative of said cross correlation peak as a function of time, and in response to the slope, identifying a direction of the dynamic gesture relative to one of the microphones.

2. The method of claim 1, also including the step of:
   controlling the device in response to identification of at least one said touch gesture.

3. The method of claim 1, also including the step of:
   controlling a system including the device in response to identification of at least one said touch gesture.

4. The method of claim 1, wherein step (a) includes a step of processing at least one of the outputs of the microphones to distinguish between a tap exerted on the device and each of a predetermined set of dynamic gestures exerted on the device.

5. The method of claim 1, wherein step (a) includes a step of microphone output signal analysis and classification that alters or disables detection of touch gestures in response to at least one determined signal condition to avoid false touch gesture detection.

6. The method of claim 1, wherein step (a) includes a step of distinguishing a touch gesture executed by a nail of a user's finger from a gesture executed by a pad of a user's finger.

7. The method of claim 1, wherein step (a) includes a step of performing state based filtering to improve touch gesture detection performance.

8. The method of claim 1, wherein step (a) includes use of at least one of context and state information, determined from the device, that is not directly related to touch gesture detection.

9. The method of claim 1, wherein step (a) includes determination of peak to average power ratio of at least one of the outputs of the microphones.

10. The method of claim 1, wherein step (a) includes determination of a power ratio of the outputs of two of the microphones as a function of time.

11. The method of claim 1, wherein step (a) includes determination of a characteristic of a relative power spectrum determined from the outputs of two of the microphones.

12. The method of claim 1, wherein the device has a surface texture, and step (a) includes determination from output of a trend of a pitch estimator related to the surface texture.

13. A method for identifying at least one touch gesture exerted by a user on a device, wherein the device is a headset which includes at least two microphones, said method including a step of:

(a) processing outputs of the microphones to identify the at least one touch gesture exerted by the user on the device, including by determining a cross correlation peak as a function of time between the outputs of two of the microphones, and identifying at least one said touch gesture as a slide gesture exerted by the user on the device, in response to identifying a trend over time, and a slope of said trend over time, in values indicative of said cross correlation peak as a function of time, and in response to the slope, identifying a direction of the slide gesture relative to one of the microphones.

14. The method of claim 13, wherein step (a) includes a step of distinguishing between a tap exerted by the user on the device and at least one dynamic gesture exerted by the user on the device.

15. The method of claim 13, also including a step of:
controlling the device or a system including the device, in response to identification of at least one said touch gesture.

16. A system for detecting ambient sound and touch gestures, said system including:

a device including at least two microphones configured to detect ambient sound, wherein the device is a headset; and a processor coupled and configured to process outputs of the microphones to identify at least one touch gesture exerted by a user on the device, including by determining a cross correlation peak as a function of time between the outputs of two of the microphones, and identifying at least one said touch gesture as a dynamic gesture exerted by the user on the device in response to identifying a trend over time in values indicative of said cross correlation peak as a function of time, and wherein the processor is coupled and configured to determine a slope of the trend over time in said values indicative of said cross correlation peak as a function of time, and in response to the slope, to identify a direction of the dynamic gesture relative to one of the microphones.

* * * * *